United States Patent [19]

Leighton

[11] 4,404,439
[45] Sep. 13, 1983

[54] METHOD AND CONSTRUCTION FOR VEHICLE BRAKE PEDAL AND SWITCH ASSEMBLY

[76] Inventor: John D. Leighton, 664 Rudgate, Bloomfield Hills, Mich. 48013

[21] Appl. No.: 287,882

[22] Filed: Jul. 29, 1981

Related U.S. Application Data

[63] Continuation-in-part of Ser. No. 16,434, Mar. 1, 1979, Pat. No. 4,297,550.

[51] Int. Cl.³ .............................................. H01H 3/14
[52] U.S. Cl. ................................. 200/61.89; 200/86.5
[58] Field of Search ................. 200/61.89, 86 R, 86.5

[56] References Cited

U.S. PATENT DOCUMENTS

| | | | |
|---|---|---|---|
| 2,832,863 | 4/1958 | Quimby | 200/61.89 |
| 3,171,917 | 3/1965 | Leichsenring | 200/61.89 |
| 3,622,723 | 11/1971 | Fischel | 200/86 R |
| 3,911,394 | 10/1975 | Shames | 200/61.89 X |

Primary Examiner—J. R. Scott
Attorney, Agent, or Firm—Harness, Dickey & Pierce

[57] ABSTRACT

Two embodiments of improved brake light switches that are integrated into the brake pedal and are actuated by the application of pressure to the pedal. In one embodiment, the pedal pad is movable relative to the pedal and this relative movement effects closure of the switch.

7 Claims, 8 Drawing Figures

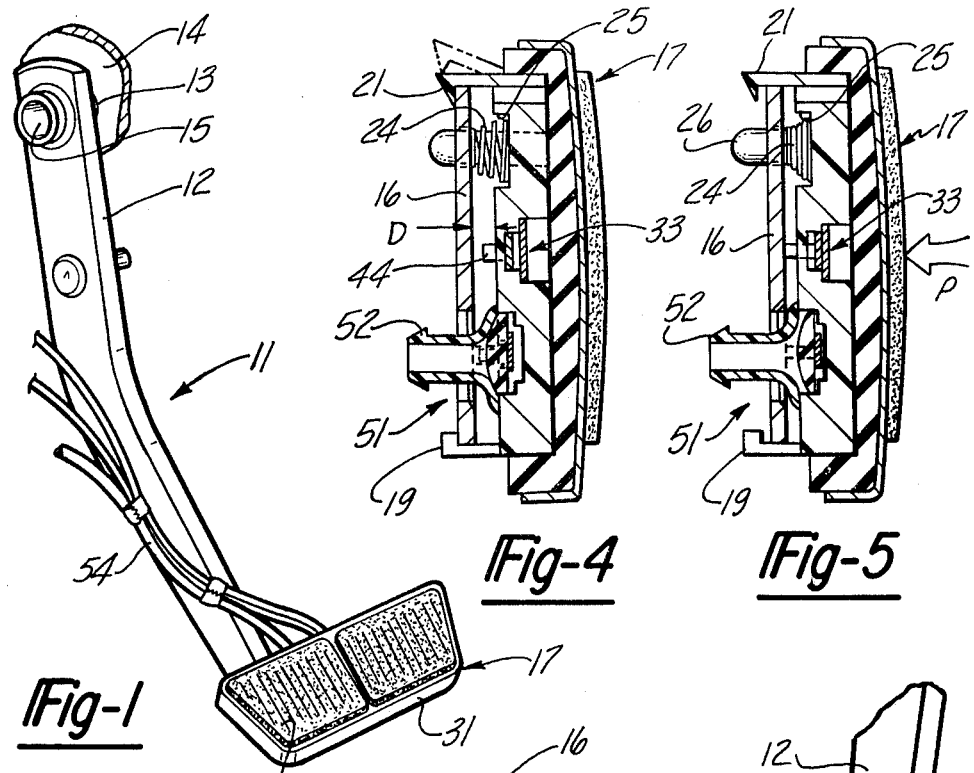
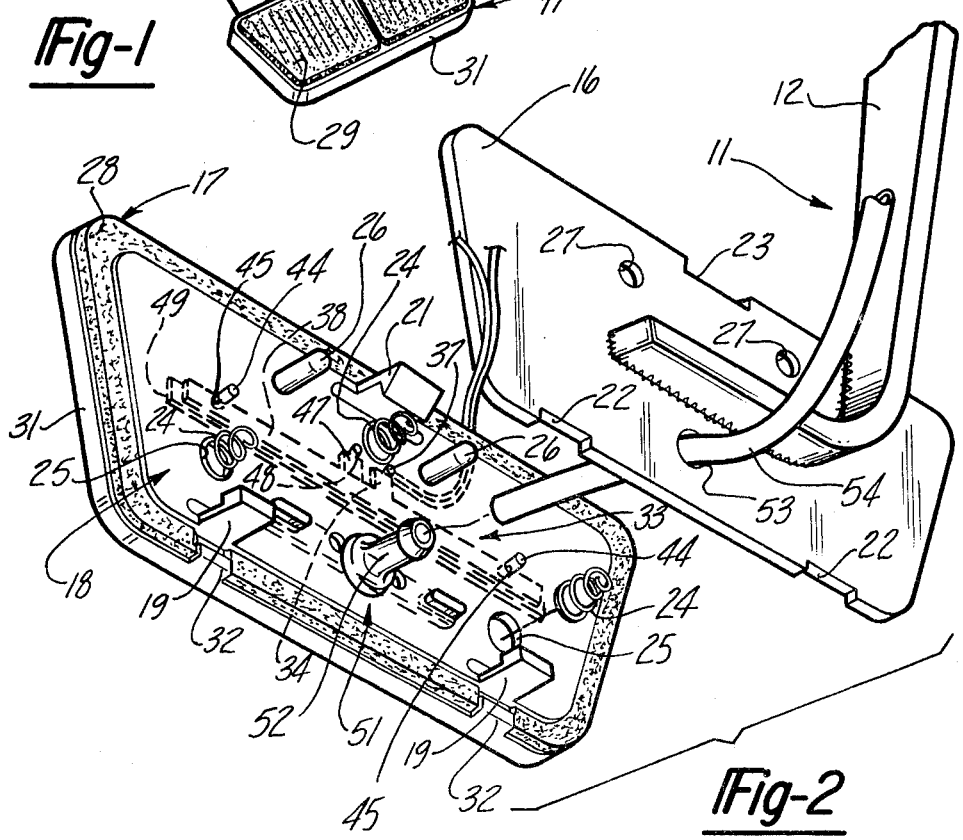

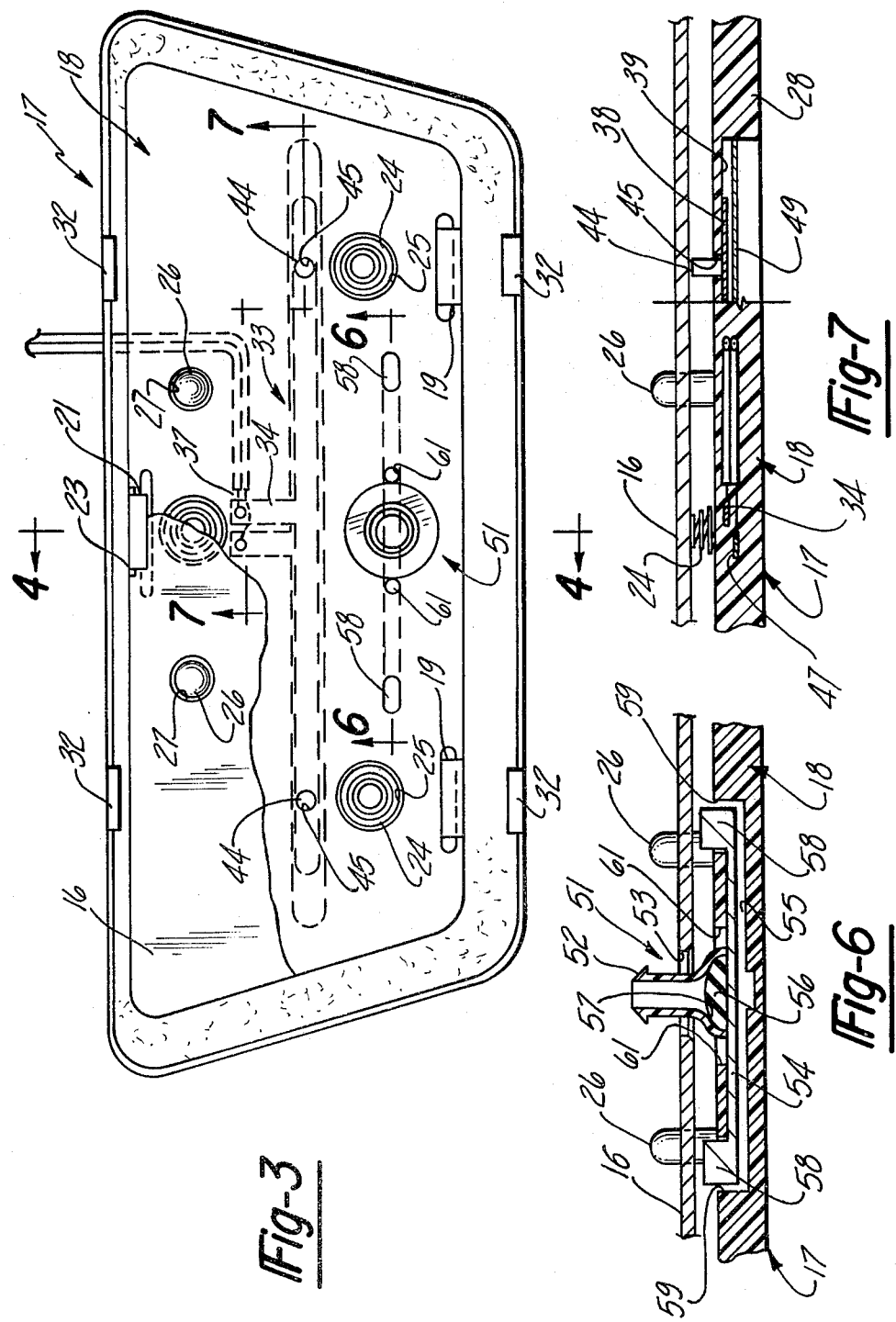

METHOD AND CONSTRUCTION FOR VEHICLE BRAKE PEDAL AND SWITCH ASSEMBLY

CROSS REFERENCE TO RELATED APPLICATION

This application is a continuation-in-part of my earlier application entitled Method and Construction For Vehicle Brake Pedal and Switch Assembly, application Ser. No. 16,434, now U.S. Pat. No. 4,297,550 filed Mar. 1, 1979.

BACKGROUND OF THE INVENTION

This invention relates to a pedal operated assembly and more particularly to an improved signal mechanism for such an assembly.

In many forms of operator controlled devices it is either desirable or necessary to provide a signal in response to actuation of the device. For example, the brake assembly of a motor vehicle includes one or more signalling devices that provide a signal when the brakes are actuated. Such signals include the illumination of the brake lights and may also include a signal for deactivating a speed control unit, for deactivating a positive lock up in an automotive transmission and other similar, well known arrangements. Conventionally, it has been the practice to provide one or more switches having contact elements that are operated through engagement with a portion of the brake pedal assembly. The use of such separate switch contacts give rise to a number of functional and cost disadvantages. For exaple, it is necessary to insure that the switch is not actuated before the brake pedal is depressed but, nevertheless, the switch should be actuated immediately upon operation of the brake pedal. Due to the normal mounting environment, the relation and adjustment of the various switches associated with the brake pedal mechanism are complicated, cumbersome and difficult to adjust. Furthermore, these switches have a tendency to go out of adjustment in time and can provide either false signals or inadequate or unduly delayed signals. The safety hazards associated with either type of arrangement should be obvious.

In order to avoid the aforenoted difficulties, it has been proposed to locate the switch assembly directly at the brake pedal in such a manner that the switch is operated upon relative movement between the pedal pad and the more rigid element of the brake pedal. Such an arrangement is shown in U.S. Pat. No. 2,674,669, entitled Pedal Operated Braking System of Road Vehicles, issued Apr. 6, 1954 in the name of C. Leedam. Although such an arrangement may overcome certain of the aforenoted defects, this arrangement employs a contact that is associated with the brake pedal pad and a separate contact which is associated with the rigid plate of the brake pedal. Thus, the switch or signal device does not form a unitary assembly. As a result of this, tolerances must be very closely held and installation and assembly of the various components is critical. For this reason, an arrangement of the type shown in this patent has not enjoyed any commercial success.

It is, therefore, a principal object of this invention to provide an improved signal device for a pedal actuated mechanism which comprises a unitary assembly which is easy to install and which requires no adjustment upon installation.

It is another object of this invention to provide a signal device for a pedal operated system that is completely contained and sealed within the pedal pad assembly.

As has been previously noted, it is common in conjunction with vehicles embodying speed control devices to provide a speed control cut off switch that is actuated when the brakes are applied. Such units have the effect of disabling the speed control unit when the brakes are actuated. The purpose of such device is believed to be obvious. Due to the difficulties as aforenoted in adjusting and maintaining adjustment of the remotely positioned switches previously employed, and to guard against mechanical failures of the electrical circuit and switches associated with it, it may be desirable to provide a separate device which will also disable the throttle positioner associated with the speed control unit. Conventionally, such speed control units employ vacuum motors that function to position the throttle valve of associated engines. In order to provide a safety backup, it has been proposed to utilize a vacuum brake switch in the vacuum motor which will also disable the vacuum signal when the brakes are actuated. The previously proposed speed control vacuum interrupting devices have pneumatic valves that are remotely positioned and which must be independently adjustable. Such arrangements have the cost, function and installation disadvantages associated with the remotely positioned brake light switches.

It is, therefore, a still further object of this invention to provide a vacuum interrupting device that is associated directly with the brake pedal and which will be operated immediately upon actuation of the brake pedal.

SUMMARY OF THE INVENTION

A first feature of this invention is adapted to be embodied in a signal mechanism for a pedal operated device which includes an actuating element for operating the device. A pedal pad is detachably connected to the actuating element and has first and second relatively movable parts. The pedal pad has a portion that is adapted to be engaged by the foot of an operator and the fist relatively movable part is associated with the pedal pad portion for movement therewith. Means provide an operative connection between the second part of the pedal pad and the actuating element whereby the second part moves with the actuating element upon its actuation. The first and second pedal parts are movable relative to each other upon initial operation of the device through the application of pressure by an operator's foot to the pedal pad portion. Signal means are provided for providing a signal upon such relative movement between the pedal pad first and second parts.

Another feature of this invention is adapted to be embodied in a signaling device for deactivating a vacuum operted mechanism upon actuation of a pedal by an operator. In connection with this feature of the invention, the pedal operated member comprises a pedal and a pad affixed to the pedal, means are provided for transmitting a vacuum signal from the vacuum actuated mechanism to the pedal, signal means are provided for venting the vacuum signal to the atmosphere upon actuation of the pedal by the application of pressure to the pedal pad from the foot of an operator.

Yet another feature of the invention is adapted to be embodied in a pedal pad adapted to be detachably affixed to a pedal and operative to provide a signal. Such a pedal pad includes a face portion adapted to be engaged by the foot of an operator and attachment means for affixing the pad to the pedal and permitting lost motion therebetween. The pedal pad includes first signal means fixed relative to the face thereof and second signal means movable relative to the first signal means and supported for movement by the pedal pad. The first and second signal means are relatively movable between first and second relative positions to provide a signal in at least one of such positions. Means are provided for operatively coupling the second signal means to the associated pedal for moving the first and second signal means relative to each other upon movement of the pedal pad relative to the associated pedal.

BRIEF DESCRIPTION OF THE DRAWINGS

FIG. 1 is a perspective view of an automotive brake pedal assembly embodying this invention.

FIG. 2 is an enlarged, exploded view of the pedal mechanism looking in the opposite direction from FIG. 1.

FIG. 3 is an enlarged plan view of the pedal mechanism.

FIG. 4 is a cross-sectional view taken alone the line 4—4 of FIG. 3.

FIG. 5 is a cross-sectional view, in part similar to FIG. 4, showing the mechanism as it appears when pressure is applied to the pedal pad by the foot of an operator.

FIG. 6 is a cross-sectional view taken along the line 6—6 of FIG. 3.

FIG. 7 is a cross-sectional view taken along the line 7—7 of FIG. 3.

DETAILED DESCRIPTION OF THE PREFERRED EMBODIMENT

Figure 8:
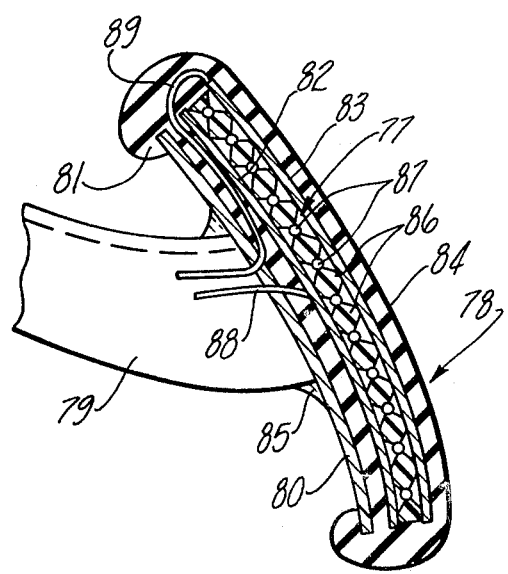
FIG. 8 is a cross-sectional view taken through a brake pedal constructed in accordance with another embodiment of the invention.

A first embodiment of an automotive brake pedal assembly embodying this invention is shown in FIGS. 1-7 and is identified generally by the reference numeral 11. The brake pedal and associated linkage is employed to actuate an automotive braking system in a known manner. Associated with the conventional brake pedal is a remotely positioned brake light switch. In addition, operation of the brake pedal may be employed to operate a further switch for deactivating a lock up clutch in certain types of automatic transmissions, as well as a further switch for disengaging the speed control unit of the associated vehicle. Furthermore, it has recently been proposed to employ this movement of the brake pedal as a device for opening an atmospheric bleed in the vacuum circuit of a servo motor of the speed control device so as to provide an additional safety factor in the event the electrical system of the speed control unit is not disabled. Previously, it has been proposed to use one or more switches and valves that are operated remotely from the linkage system of the brake unit so as to achieve these results. In addition to being installed on the assembly line, such prior art arrangements required adjstment on installation and frequently readjustment during use. This invention is directed toward an improved system wherein all of these functions can be provided directly at the brake pedal; thus reducing cost on assembly, reducing warranty costs and eliminating the possibility of human error on installation and adjustment. Furthermore, with certain of the prior art devices improper adjustment would prevent complete release of the brake resulting in unnecessary brake wear and poor fuel economy.

The brake pedal assembly 11 includes a lever 12 that is integrally connected with a bushing 13 that is pivotally supported on the fire wall 14 of the vehicle in a known manner, as by means of a pivot pin 15. A brake pedal plate 16 is affixed in any known manner, as by welding, to the lower end of the brake pedal lever 12. A combined pedal pad and signal device, indicated generally by the reference numeral 17, is detachably connected to the brake pedal plate 16 in a manner to be described.

The pedal pad 17 is a multi-part assembly that is adapted to be detachably connected as a unit to the brake pedal plate 16. The pad assembly 17 includes a substantially rigid backing piece, indicated generally by the reference numeral 18, that if formed with a pair of integrally lower tabs 19 and a single, integral upper tab 21. The tabs 19 and 21 cooperate with respective recesses 22 and 23 formed in the brake pedal plate 16 so as to afford the detachable connection between the pedal pad assembly 17 and the plate 16. The tabs 19 are generally "L" shaped in cross-section and are more rigid than the upper tab 21. The flexibility of the tab 21 and its inclined outer surface permits it to be conventiently snap fitted on to the pedal pad plate 16. The broken line view of FIG. 4 illustrates the deflection of tab 21 which occurs during this assembly. The backing piece 18 and tabs 19 and 21 may be conveniently formed from a molded plastic of any suitable type.

The rearwardmost surface of the backing piece 18 is normally spaced from the forwardmost surface of the pedal pad plate 16 by a distance indicated by the dimension D in FIG. 4. A plurality of compression springs 24 are received at one of their ends in pockets 25 formed in the backing piece 18 and bear against the pedal plate 16 to normally maintain the distance D. Alignment pins 26 also extend integrally from the rear of the backing piece 18 through enlarged apertures 27 formed in the pedal plate 16 so as to maintain alignment between the pedal assembly 17 and the plate 16 while permitting a certain degree of cocking movement between the pedal assembly 17 and the plate 16 for a reason to be described.

The backing piece 18 is affixed by either molding or by an adhesive to a rubber pad 28 which has a ribbed surface 29 that is adapted to be contacted by the foot of the vehicle operator. A metallic trim piece 31 is affixed to the rubber piece 28 in any known manner, as by means of folded over tabs.

A switch assembly, indicated generally by the reference numeral 33, is carried by the backing piece 18. The switch assembly 33 includes a first generally "T" shaped member that has a short leg 34 which forms a terminal for the switch and which is suitably affixed to the backing piece 18 and may be molded into it. A lead 37 is in electrical connection with the leg 34. A horizontally extending leg 38 extends from the leg 34 and is received within a complementary recess 39 formed in the forwardmost face of the backing piece 18 and which recess is enclosed by the rubber pad 28. A pair of actuating elements 41 are affixed to the opposite ends of the leg 38 and extend rearwardly through cylindrical apertures 45 formed in the backing piece 18. To reduce wear, minimize noise and provide electrical insulation,, the actuating pins 44 are formed from a non-metallic material such as a plastic. The actuating pins 44 terminate closely adjacent the forwardmost surface of the pedal plate 16 when pressure is not applied to the pedal pad 17. The decree of clearance, which is best shown in FIGS. 4 and 7, determines the amount of movement of the pedal pad assembly 17 relative to the plate 16 before the switch 33 will be closed, as will become apparent.

The switch 33 includes a second "T" shaped contact element having a short leg 46 that is affixed as by molding to the backing piece 18 and which is adapted to be in electrical contact with a second conductor 48 that extends through the backing piece 18. This second contact element includes a long horizontal leg 49 that extends through the recess 39 of the piece 18 and is normally spaced from the leg 38. Thus, the legs 38 and 39 are normally spaced from each other and the terminals of the conductors 37 and 48 provide an open circuit.

When an operator does not apply pressure to the surface 29 of the pedal pad 17, the distance D is maintained by the springs 24. The actuating pins 44 are, in this condition, spaced very slightly from the face of the brake pdal plate 16. This condition is shown in FIGS. 4, 6 and 7. When pressure is applied by the operator to the brake pedal pad 17 so as to apply the vehicle brakes, the springs 24 will initially yield so as to permit the pad assembly 17 to move slightly relative to the plate 16 to the position shown in FIG. 5. This movement is very slight and has been exaggerated in the drawings so as to make the operation of the device more readily understood. As the pad assembly 17 begins its rearward movement relative to the plate 16, the actuating pins 44 will engage the face of the plate 16 and cause the ends of the contact element leg 38 to deflect into engagement with the contact element leg 49. A circuit is then complete between these two contact elements which may be employed to actuate the brake light either directly or through an appropriate relay. If a relay is to be employed, the relay may be embedded into the rubber material 28 of the pad assembly 17.

When the leg 38 deflects into engagement with the leg 49, this latter leg may also be deflected through the recess 39 so as to minimize the stresses on the contact elements. The force necessary to actuate the switch 33 depends primarily upon the strength of the springs 24. The rigidity of the leg 38 of the contact element will also enter into this determination. However, the springs 24 are more rigid than the contact element 38 so that they will primarily determine the force necessary to actuate the switch 33.

The connection between the pad 17 and the plate 16 is such that the pad 17 may pivot slightly relative to the plate 16. As has been previously noted, the pins 26 and plate apertures 27 limit the amount of pivotal movement. This pivotal movement is provided so as to insure that the switch 33 will be actuated even if the force applied to the pad 17 by the operator is other than in its center.

In addition to actuating the brake lights, the switch 33 may be used to electrically deactivate a speed control unit of the automobile and also to deactivate a lock up clutch of the automatic transmission. Alternatively, if it is desired to provide separate switches for each of these functions, additional switch assemblies like the switch assembly 33 may be molded into the brake pad 17 for each function. If such separate switches are used, the actuating pin 44 associated with each switch may be made of a different length to provide the desired sequence of actuation. For example, it may be desirable to deactivate either or both of the speed control or lock up clutch prior to illumination of the brake lights. This may be done by providing actuating pins for these switch elements that are longer than the pin 44 associated with the brake light switch.

To provide additional safety back up for deactivating the speed control unit, a vacuum interrupter device, indicated generally by the reference numeral 51, is also provided in the pedal pad 17. The vacuum interrupter device 51 includes a nipple 52 that is either molded integrally with the backing piece 18 or which may be separately affixed to it. The nipple 52 extends with clearance through an opening 53 in the pedal plate 16 and has an flexible conduit 54 connected to it. The conduit 54 is in pneumatic circuit in any suitable manner with the vacuum servo motor (not shown) of the speed control device. As is well known, a vacuum servo motor is used for holding the accelerator linkage in the appropriate position to maintain the preset vehicle speed.

A contact bar 54 is mounted within a recess 55 formed in the backing piece 18 and carries a valving element 56 that cooperates with a seat 57 formed in the base of the nipple 52. The contact bar 54 has a pair of rearwardly extending projections 58 that extend through apertures 59 in the backing piece 18 and which are juxtaposed to forward face of the pedal plate 16. When the springs 24 hold the pedal pad 17 at the distance D from the pedal plate 16, the valving element 56 will be drawn into engagement with the seat 57 so as to close off any atmospheric bleed to the vacuum servo motor of the speed control device. When the brake pedal pad 17 is engaged by an operator's foot and the springs 24 yield, the projections 58 will engage the pedal plate 16 and force the valving element 56 away from the seat 57. An atmospheric leak will, therefore, be created which may be augmented through an opening 61 formed in the backing piece 18 in proximity to the nipple 52. This atmospheric leak will cause deactivation of the speed control unit even if the electrical deactivation has been inoperative.

As with the switch 33, the vacuum interrupting device 51 will also operate if the pedal pad 17 pivots relative to the pedal plate 16 due to the unequal application of operator pressure to it.

If desired, the rubber pad 28 may be provided with an integral rearwardly extending flange around its outer periphery that will encircle the pedal plate 16 so as to conceal it. Such a flange is not shown but it is believed that its construction should be obvious to those skilled in the art. The use of such a flange would not interfere with the relative movement between the pad 17 and the pedal plate 16 but serves primarily an appearance function.

FIG. 8 illustrates another embodiment of the invention in which the brake stop light switch, generally indicated at 77, is incorporated in the brake pedal pad itself, the latter being indicated generally at 78. The pedal pad 78 is secured to a steel plate 80 affixed to the lower end of the brake pedal lever 79. The pedal pad 78 is formed of a rubber or other resilient cover having flanges 81 overlapping the edges of plate 80. A pair of electrically conductive contacts 82 and 83 are provided in the form of flat metallic members disposed between the outer layer 84 and the inner layer 85 of the cover. A thin silicone strip 86 having metal balls 87 molded therein is disposed between contacts 82 and 83. The material comprising the silicone strip and metal balls is known by the trademark "Press-Ex" sold by Essex International of Detroit, Michigan. A pair of wire leads 88 and 89 are connected to plates 82 and 83 respectively. Wire 89 is embedded in resilient layer 85 and, together with wire 88, extends uner the web of channel-shaped brake pedal lever 79 to the brake light circuit.

In operation of the embodiment of FIG. 8, when the brake pedal lever is in the inoperative position and the operator is not pressing on the pedal, the switch comprising the Press-Ex material and the two contacts 83 and 84 will be open. When the operator presses his foot on pedal surface 82, the two contacts 83 and 84 will be connected, actuating the brake stop light, while at the same time the brake will be actuated.

It should be readily apparent that pedal operated signal devices have been illustrated and described that provide an early indication of brake application and which can also be used to deactivate various other systems such as speed control and transmission lock ups. The device can be conveniently changed so as to set the pressure necessary to activate it and can be pre-adjusted by the manufacturer of the pedal pad assembly so that no adjustments will be required upon installation. The sealed configuration also protects the components against wear and the entrainment of foreign particles that would adversely effect its life. Various changes and modifications may be made without departing from the spirit and scope of the invention, as defined by the appended claims.

I claim:

1. A signal mechanism for a pedal operated device comprising an actuating element for said device, a pedal pad detachably connected to said actuating element, first and second relatively movable signal parts carried by said pedal pad and having first and second relative positions for providing a signal in one of said relative positions, said pedal pad having a portion adaptable to be engaged by the foot of an operator, said first signal part being affixed for movement with said pedal pad portion, said pedal pad portion being movable relative to said actuating element upon actuation by the foot of an operator before said actuating element is operated to actuate said device, and means for moving said second signal part relative to said first signal part between its first relative position and its second relative position upon movement of said pedal pad portion relative to said actuating element.

2. A signal mechanism for a pedal operated device as set forth in claim 1 wherein the first and second signal parts provide an electrical signal.

3. A signal mechanism for a pedal operated device as set forth in claim 2 wherein the first and second signal parts comprise a pair of electrical conductors, said conductors being spaced from each other when in their first relative position and being in contact with each other when in their second relative position for completing an electrical circuit.

4. A signal mechanism for a pedal operated device as set forth in any one of the preceding claims wherein there are biasing spring means interposed between the pedal pad and the actuating element for maintaining the pedal pad and actuating element in a predetermined spaced position.

5. A pedal pad adapted to be detachably affixed to a pedal and operative to provide a signal, said pedal pad including a face portion adapted to be engaged by the foot of an operator, attachment means for fixing said pad to said pedal and for permitting lost motion therebetween, first signal means fixed relative to said face portion of said pedal pad, second signal means supported by said pedal pad for movement relative to said first signal means, said first and said second signal means being movable relative to each other between a first relative position and a second relative position for providing a signal, said second signal means having means for operatively coupling said second signal means to the associated pedal for actuation of said second signal means relative to said first signal means upon movement of said pedal pad relative to the associated pedal.

6. A signal mechanism for a pedal operated device as set forth in claim 5 wherein the first and second signal means provide an electrical signal.

7. A signal mechanism for a pedal operated device as set forth in claim 6 wherein the first and second signal means comprise a pair of electrical conductors, said conductors being spaced from each other when in their first relative position and being in contact with each other when in their second relative position for completing an electrical circuit.

* * * * *